US012760579B2

(12) United States Patent
Kawanobe

(10) Patent No.: US 12,760,579 B2
(45) Date of Patent: Oct. 13, 2026

(54) OPENING AND CLOSING CONTROL DEVICE

(71) Applicant: HI-LEX ACT Corporation, Yokohama (JP)

(72) Inventor: Osamu Kawanobe, Kanagawa (JP)

(73) Assignee: HI-LEX ACT Corporation, Yokohama (JP)

( * ) Notice: Subject to any disclaimer, the term of this patent is extended or adjusted under 35 U.S.C. 154(b) by 131 days.

(21) Appl. No.: 18/785,962

(22) Filed: Jul. 26, 2024

(65) Prior Publication Data

US 2025/0034929 A1 Jan. 30, 2025

(30) Foreign Application Priority Data

Jul. 28, 2023 (JP) ................................ 2023-123160

(51) Int. Cl.
*E05F 15/48* (2015.01)
*E05F 15/659* (2015.01)

(52) U.S. Cl.
CPC ............ *E05F 15/48* (2015.01); *E05F 15/659* (2015.01); *E05Y 2201/41* (2013.01); *E05Y 2400/336* (2013.01); *E05Y 2400/55* (2013.01); *E05Y 2400/564* (2013.01); *E05Y 2900/531* (2013.01)

(58) Field of Classification Search
None
See application file for complete search history.

(56) References Cited

U.S. PATENT DOCUMENTS 6,178,699 B1 * 1/2001 Kawanobe ............ E05F 15/632 49/31
2003/0115803 A1 * 6/2003 Kidokoro ................ E05F 15/40 49/28
2019/0145147 A1 * 5/2019 Takenaka ................ H02P 23/18 701/49

(Continued)

FOREIGN PATENT DOCUMENTS

DE 19828393 A1 * 1/1999 ................ B60J 5/06
JP 2004180480 A * 6/2004
JP 7192587 B2 12/2022

OTHER PUBLICATIONS

Machine translation of Kato et al. (DE-19828393-A1) (Year: 1999).*

(Continued)

*Primary Examiner* — Navid Z. Mehdizadeh
*Assistant Examiner* — Sarah A. Mueller
(74) *Attorney, Agent, or Firm* — Foley & Lardner LLP

(57) ABSTRACT

An opening and closing control device includes a motor configured to drive, in an opening and closing direction, an opening and closing body that is supported a vehicle body and allowed to be opened and closed, a controller configured to control the motor, and a pulse encoder configured to output a pulse signal. The controller adjusts an advance angle of the motor, detects a rotational speed of the motor or an opening and closing speed of the opening and closing body according to pulse detection based on the pulse signal output from the pulse encoder, and detects a pinching state of the opening and closing body when the rotational speed of the motor or the opening and closing speed of the opening and closing body is equal to or less than a threshold value during advance angle control on the motor.

7 Claims, 8 Drawing Sheets

(56) References Cited

U.S. PATENT DOCUMENTS

| | | | | |
|---|---|---|---|---|
| 2020/0291705 | A1 | 9/2020 | Takenaka et al. | |
| 2022/0268080 | A1 * | 8/2022 | Sturm | E05C 17/003 |
| 2025/0300581 | A1 * | 9/2025 | Irisawa | H02P 6/153 |

OTHER PUBLICATIONS

Machine translation of Kuwano et al. (JP-2004180480-A) (Year: 2004).*

* cited by examiner

[THIRD EXAMPLE OF ADVANCE ANGLE SETTING PROCESS]

[FOURTH EXAMPLE OF ADVANCE ANGLE SETTING PROCESS]

| INCLINATION ANGLE θ (°) | ADVANCE ANGLE (°) |
|---|---|
| θ < 3 | 30 |
| 3 ≤ θ < 5 | 20 |
| 5 ≤ θ < 8 | 10 |
| 8 ≤ θ | 0 |

OPENING AND CLOSING CONTROL DEVICE

CROSS-REFERENCE TO RELATED APPLICATIONS

This application is based on and claims priority under 35 USC 119 from Japanese Patent Application No. 2023-123160 filed on Jul. 28, 2023, the entire content of which is incorporated herein by reference.

TECHNICAL FIELD

The present disclosure relates to an opening and closing control device.

BACKGROUND ART

Regarding an opening and closing body control device for a vehicle, an opening and closing body control device for detecting pinching based on a value of a current flowing through a motor is known as disclosed in JP7192587B. However, immediately after a door operation such as a movement from a close position or a full-open position, and when a full-open latch device for holding a door at the full-open position meshes with a striker, for example, a value of a current increases due to motor startup or load increase and become unstable, and thus there is a problem in detection accuracy of the pinching.

In addition, as disclosed in JP6291663B, when a door is in a full-open side region or a full-close side region, pinching is detected based on a pulse signal of a rotation angle sensor, and when the door is in an intermediate region, the pinching is detected based on a value of a current, so that the problem described above is solved.

However, in JP6291663B, both a current sensor and the rotation angle sensor are required, cost is increased.

SUMMARY OF INVENTION

The present disclosure provides an opening and closing control device capable of accurately detecting a pinching state while restraining an increase in cost.

An aspect of the present disclosure relates to an opening and closing control device, including:

- a motor configured to drive, in an opening and closing direction, an opening and closing body that is supported a vehicle body and allowed to be opened and closed;
- a controller configured to control the motor; and
- a pulse encoder configured to output a pulse signal,
- in which the controller is configured to:
  - adjust an advance angle of the motor;
  - detect a rotational speed of the motor or an opening and closing speed of the opening and closing body according to pulse detection based on the pulse signal output from the pulse encoder; and
  - detect a pinching state of the opening and closing body when the rotational speed of the motor or the opening and closing speed of the opening and closing body is equal to or less than a threshold value during advance angle control on the motor.

According to the aspect of the present disclosure, it is possible to accurately detect the pinching state without a current sensor.

BRIEF DESCRIPTION OF DRAWINGS

Exemplary embodiment(s) of the present invention will be described in detail based on the following figures, wherein.

DESCRIPTION OF EMBODIMENTS

Figure 1:
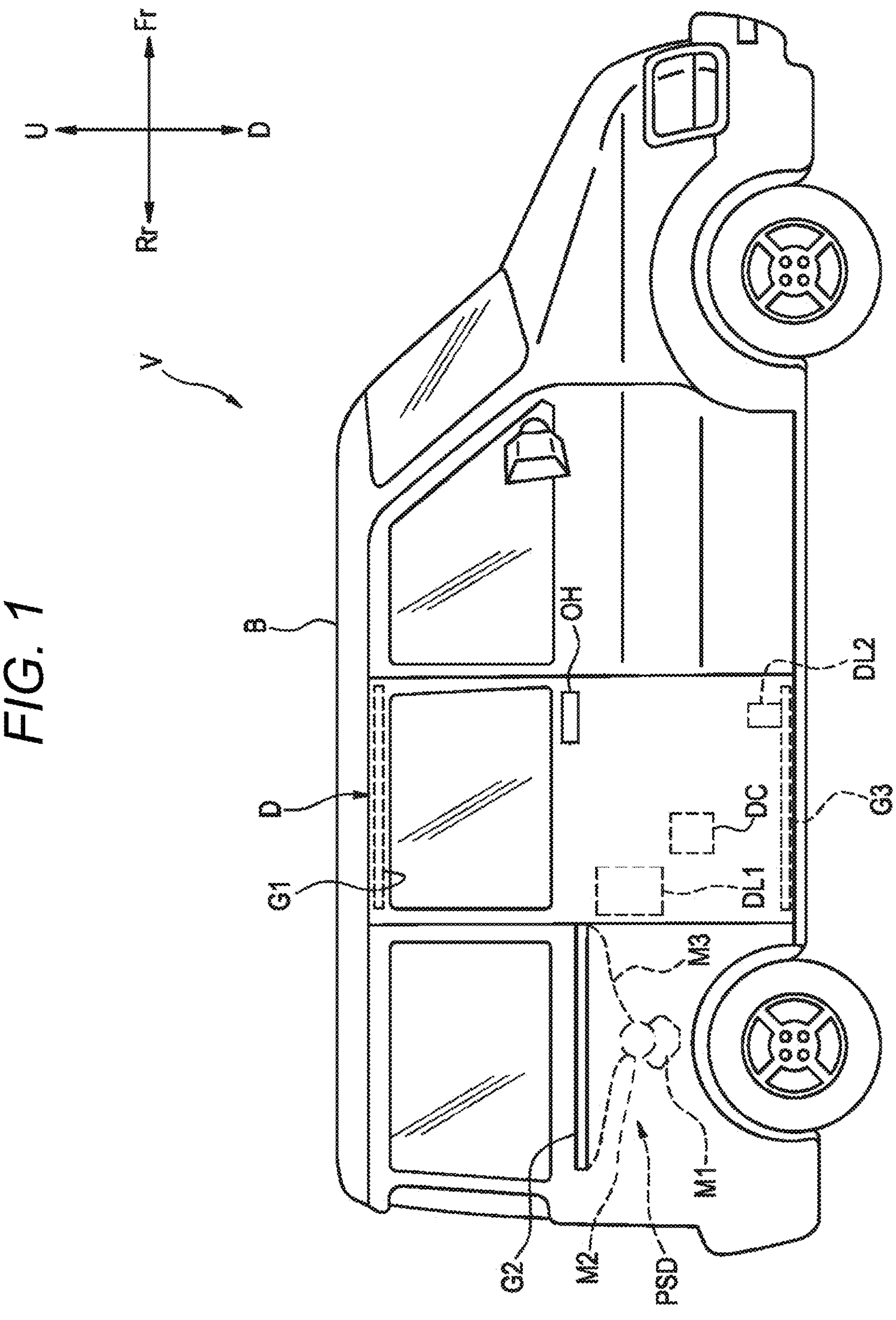
FIG. 1 is a side view of a vehicle to which an opening and closing control device according to an embodiment of the present disclosure is applied.

Hereinafter, an embodiment of the present disclosure will be described with reference to FIGS. 1 to 10. The drawings are to be viewed in directions of reference signs, in the following description, the front and rear, the left and right, and the top and bottom are described according to a direction viewed from a driver, and a front side of a vehicle body B of a vehicle V is denoted by Fr, a rear side thereof is denoted by Rr, a left side thereof is denoted by L, a right side thereof is denoted by R, an upper side thereof is denoted by U, and a lower side thereof is denoted by D in the drawings.

As illustrated in FIG. 1, a slide door (hereinafter, referred to as a "door") D of the vehicle V is supported on guide rails G1, G2, and G3, which are fixed to a side surface of the vehicle body B and are oriented in a front-rear direction, so as to be allowed to be opened and closed in the front-rear direction. The door D can be moved from a full-close position, at which a doorway provided on the side surface of the vehicle body B is closed, to a full-open position, at which the door D is moved rearward along the side surface of the vehicle body B while being moved slightly outward from an outer side surface of the vehicle body B, by a manual operation to be manually performed and an electric operation to be performed by power from a door opening and closing motor M1 of a door opening and closing drive device PSD to be described later, and vice versa, can be moved from the full-open position to the full-close position.

Figure 3:
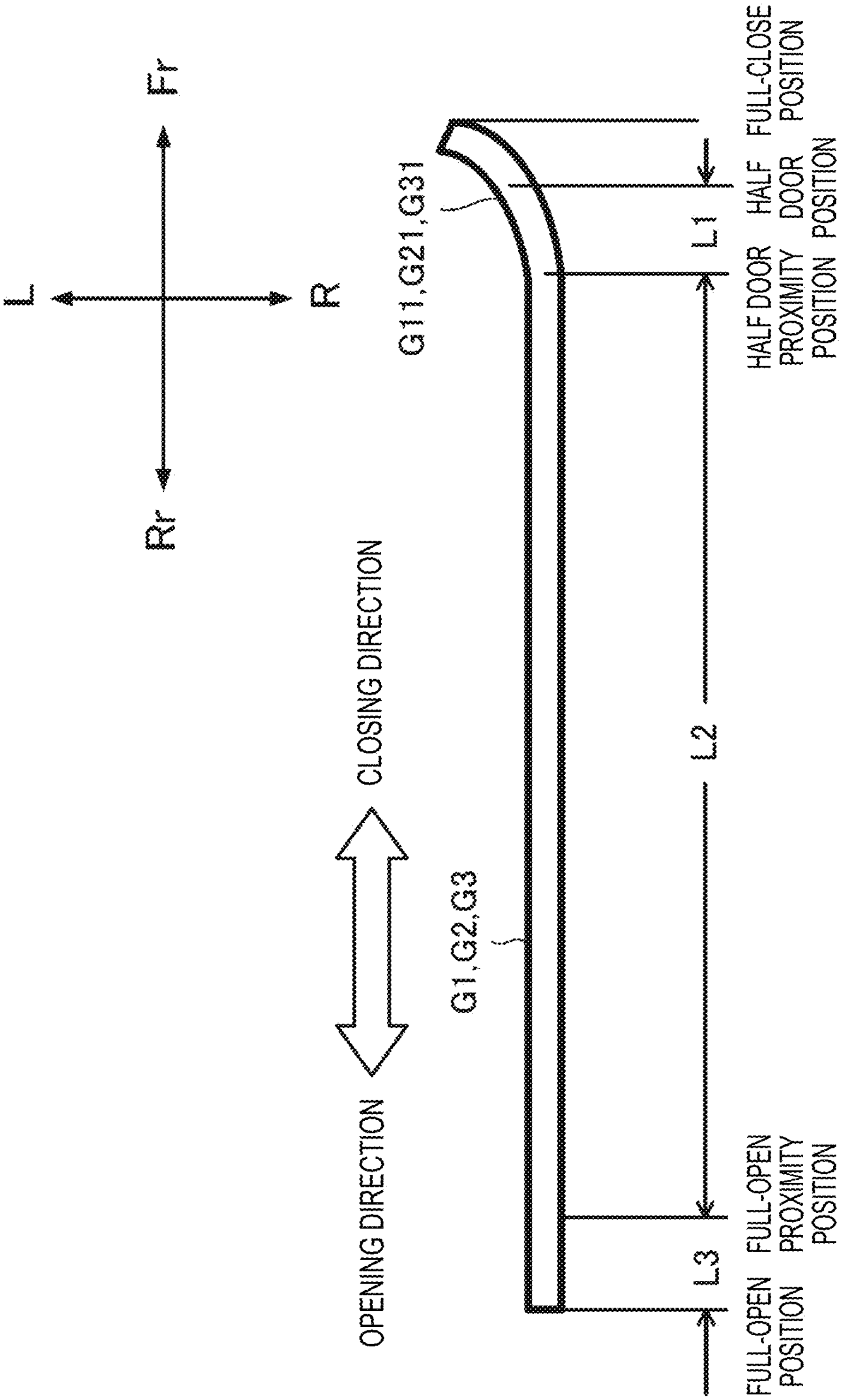
FIG. 3 is an explanatory diagram illustrating an opening and closing region of a door D.

The guide rail G2 guides and supports the door D to be able to move rearward along the side surface of the vehicle body B while moving slightly outward from the outer side surface of the vehicle body B during an opening operation of the door D, and thus as illustrated in FIG. 3, a front portion of the guide rail G2 is curved toward the inside of the vehicle, and a portion rearward of the curved portion is formed in a straight-line shape. The guide rails G1 and G3 are also formed in the same shape.

A full-close latch device DL1 for holding the door D at the full-close position and a door closer device DC for closing the door D from a half door position to the full-close position are provided at a rear end portion in the door D.

The full-close latch device DL1 includes a meshing mechanism. The meshing mechanism includes a latch (not shown) that can mesh with a full-close striker (not shown) fixed at an appropriate position on an opening rear edge in the doorway, and a ratchet (not shown) that is engaged with the latch engaged with the full-close striker to prevent the latch from rotating in an opening direction. During a closing operation of the door D, the full-close latch device DL1 rotates to be in a full latch state (corresponding to the full-close position of the door D) in which the latch completely meshes with a full-open striker from a half latch state (corresponding to the half door position of the door D) in which the latch slightly meshes with the full-close striker, thereby holding the door D at the full-close position.

The door closer device DC includes a closer motor 61 that moves the door D from the half door position to the full-close position by rotating the latch of the full-close latch device DL1 from the half latch state to the full latch state. When a half latch detection switch 51 provided in the full-close latch device DL1 detects the half latch state of the latch, the closer motor 61 of the door closer device DC drives to rotate the latch from the half latch state to the full latch state. Accordingly, the door D can be moved from the half door position to the full-close position against a reaction force of a door seal. Since each of the full-close latch device DL1 and the door closer device DC adopts a known structure, detailed descriptions thereof are omitted.

A full-open latch device DL2 for holding the door D at the full-open position is provided at a lower front portion of the door D. The full-open latch device DL2 is meshed with the full-open striker (not shown) fixed to a lower portion of the vehicle body B by the opening operation of the door D, thereby holding the door D at the full-open position.

Due to door opening operations of an outside handle OH provided on a vehicle-outer-side of the door D and an inside handle (not shown) provided on a vehicle-inter-side thereof and a release operation of a release electric actuator (not shown) connected to the full-close latch device DL1 and the full-open latch device DL2, the full-close latch device DL1 and the full-open latch device DL2 are respectively removed from the respective strikers to enable the opening operation and the closing operation of the door D.

The door opening and closing drive device PSD includes the door opening and closing motor M1 that is disposed on a side surface of the vehicle body B and is capable of rotating forward and backward, a rotary drum M2 that is capable of rotating forward and backward via a speed reducer that decelerates the rotation of the door opening and closing motor M1, a cable M3 that is wound around the rotary drum M2 in such a manner as to be wound around and fed out of the rotary drum M2, is wired along the guide rail G2, and is connected to the rear end portion of the door D, and an electromagnetic clutch 44 that is capable of disconnecting a power transmission path between the door opening and closing motor M1 and the rotary drum M2. In the door opening and closing drive device PSD, the electromagnetic clutch 44 operates in a connected state based on operations of a handle switch 11 interlocked with opening and closing operations of the outside handle OH and the inside handle and an operation switch 12 provided in the vicinity of a driver seat, a portable wireless remote control switch, or the like, and when the door opening and closing motor M1 rotates (forward or backward), the rotation is transmitted to the door D via the electromagnetic clutch 44, the rotary drum M2, and the cable M3 to operate the door D in the opening direction or a closing direction. Further, when the electromagnetic clutch 44 is in a disconnected state, the door D can be opened and closed by the manual operation without receiving resistance for rotating the speed reducer and the door opening and closing motor M1 backward.

During the closing operation of the door D, the door opening and closing motor M1 is driven in a period in which the door D is moved from the full-open position to the half door position, and the driving thereof is stopped in a period in which the door D is driven by the closer motor 61 to move from the half door position to the full-close position. That is, during the closing operation of the door D, the door opening and closing motor M1 serves as a drive source for moving the door D from the full-open position to the half door position, and the closer motor 61 serves as a drive source for moving the door D from the half door position to the full-close position.

The rotary drum M2 is provided with a pulse encoder 45 that detects a rotation angle of the rotary drum M2 with a high resolution and outputs a pulse signal corresponding to the rotation. Since the rotary drum M2 is connected to the door D via the cable M3 and substantially rotates in synchronization with an opening and closing operation of the door D, detecting a rotation speed and the rotation angle of the rotary drum M2 is substantially the same as detecting an opening and closing speed of the door D and the position of the door D. Therefore, in the following description, the pulse encoder 45 is described as a member that outputs a pulse signal corresponding to the movement of the door D.

The pulse encoder 45 outputs pulse signals corresponding to the opening and closing directions, the opening and closing speed, and a movement amount of the door D, and the pulse signals are transmitted to a control device (controller) 9 provided at an appropriate position on the vehicle body B.

Next, the control device 9 and respective electrical elements connected to the control device 9 will be described with reference to the block diagram illustrated in FIG. 2.

The control device 9 is electrically connected to an on-vehicle battery (not shown) and comprehensively controls driving elements among the electric elements according to program control by a microcomputer. The control device 9 includes a pulse detection unit 91 that calculates the opening and closing speed, a moving direction, and a current position of the door D according to pulse detection based on the pulse signal output from the pulse encoder 45; a motor control unit 92 that controls the door opening and closing motor M1; a clutch control unit 93 that controls the electromagnetic clutch 44; an inclination detection unit (inclination detector) 94 that detects an inclination of the vehicle body B; a closer control unit 95 that controls the closer motor 61 of the door closer device DC; a clipping detection unit 96 that detects contact of a human body and other obstacles to the door D, the clipping, and the like; an actuator control unit (not shown) that controls the release electric actuator connected to the full-close latch device DL1 and the full-open latch device DL2; a drive circuit unit 97 that is turned on or off based on control of the motor control unit 92, the clutch control unit 93, and the closer control unit 95; and a drive determination unit 98 that performs drive determination of the door D based on opening operation signals of the handle switch 11 and the operation switch 12 and an output of the half latch detection switch 51.

The pulse detection unit 91 includes a door speed calculation unit 911 that calculates the opening and closing speed of the door D or a rotation speed of the door opening and closing motor M1 based on a pulse width of the pulse signal output from the pulse encoder 45 according to the opening and closing operation of the door D, a door moving direction detection unit 912 that detects the moving direction of the door D based on a phase relation of a two-phase pulse signal, and a door position calculation unit 913 that counts the pulse signal output from the pulse encoder 45 and detects the current position of the door D based on a count value which is counted. Since the rotation speed of the door opening and closing motor M1 is a motor rotational speed per unit time, the rotation speed of the door opening and closing motor M1 may be referred to as the rotational speed of the door opening and closing motor M1.

As illustrated in FIG. 3, an opening and closing operation region of the door D includes a full-close side region L1, an intermediate region L2, and a full-open side region L3, and which region of the regions L1 to L3 the door D is located in is recognized based on the number of pulses that is obtained by the door position calculation unit 913 counting the pulse signal output from the pulse encoder 45. The full-close side region L1 refers to a region (a deceleration region before the door D reaches the half door position during the closing operation of the door D, which corresponds to curved portions G11, G21, and G31 at front portions of the guide rails G1, G2, and G3) between the half door position (corresponding to the half latch state of the full-close latch device DL1) and a half door proximity position of the door D of which opening and closing operation is performed along the guide rail G2. The full-open side region L3 refers to a region between the full-open position (a position at which the full-open latch device DL2 completely meshes with the full-open striker) and a full-open proximity position (a position at rear end portions of straight line portions of the guide rails G1, G2, and G3 and at which the full-open latch device DL2 starts to come into contact with the full-open striker during the opening operation of the door D). The intermediate region L2 refers to a region between the full-close side region L1 and the full-open side region L3.

A target speed of the door D is set in advance so as to be a low speed in the full-close side region L1 and the full-open side region L3 and to be a high speed in the intermediate region L2, and is stored in a storage area of the control device 9. Therefore, the full-close side region L1 and the full-open side region L3 can be defined as low-speed regions and the intermediate region L2 can be defined as a high-speed region.

The motor control unit 92 includes a PWM control unit 921 that performs pulse width modulation (PWM) control on the door opening and closing motor M1, and an advance angle adjustment unit 922 that adjusts an advance angle of the door opening and closing motor M1.

The PWM control unit 921 performs the PWM control on the door opening and closing motor M1 based on a control procedure (see FIGS. 5 and 6) to be described later to perform the opening and closing operation of the door D. When the pinching detection unit 96 detects the pinching state during the opening and closing operation of the door D, the PWM control unit 921 performs inversion control on the door opening and closing motor M1 to release the pinching state in which the door D pinches an obstacle.

Figure 4:
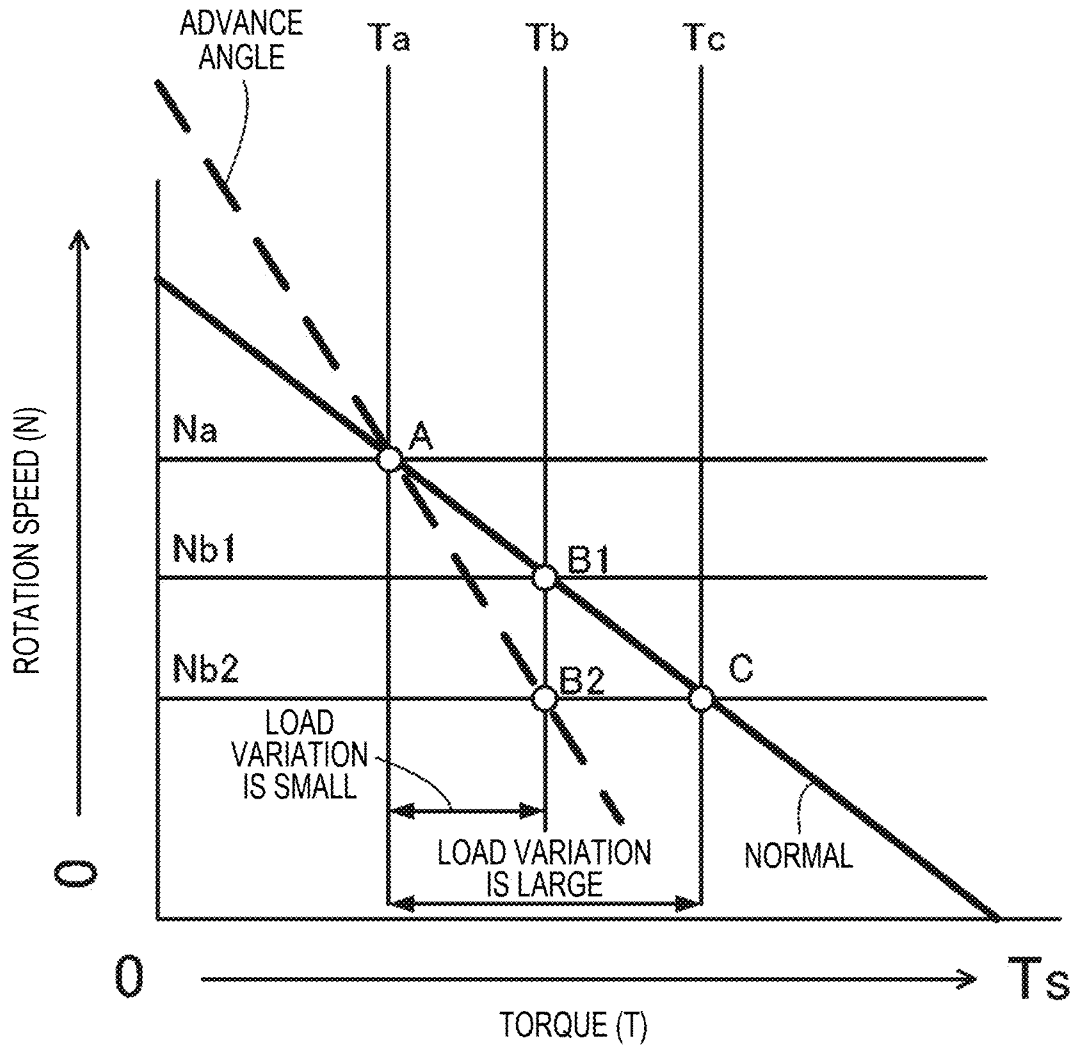
FIG. 4 is an explanatory diagram illustrating a rotation speed variation and a torque variation (a load variation) at the time of occurrence of pinching.

The door opening and closing motor M1 is a brushless motor capable of advancing and controlling a phase of a motor control signal, and the advance angle adjustment unit 922 changes motor characteristics of the door opening and closing motor M1 by adjusting the advance angle (see FIG. 4). In the present description, a control state in which the advance angle is increased with respect to normal control and the motor characteristics of the door opening and closing motor M1 are set to those of a high rotation speed—low torque type motor is referred to as advance angle control. In other words, the normal control is control in which the advance angle control for setting the advance angle to zero is not performed, and has characteristics of a low rotation speed—high torque type motor with respect to the motor characteristics at the time of the advance angle control.

When the rotation speed of the door opening and closing motor M1 (or the rotational speed of the door opening and closing motor M1, or the opening and closing speed of the door D) exceeds a threshold speed (a threshold value) and decreases, the pinching detection unit 96 detects the state in which the door D pinches an obstacle. The pinching detection unit 96 can detect the pinching state of the door D during any one of the advance angle control and the normal control on the door opening and closing motor M1. Then, in the case of the advance angle control, a torque change corresponding to a rotational speed change of the door opening and closing motor M1 decreases, and the rotational speed change of the door opening and closing motor M1 accompanying a torque variation at the time of occurrence of the pinching increase. Accordingly, since the responsiveness of the pinching detection is improved, it is possible not only to accurately detect the pinching state without a current sensor but also to reduce a pinching load at the time of the pinching detection. The opening and closing control device may include a current sensor. Hereinafter, a specific principle thereof will be described with reference to FIG. 4.

FIG. 4 indicates a rotation speed variation and the torque variation (a load variation) of the door opening and closing motor M1 at the time of occurrence of the pinching. As illustrated in FIG. 4, when the pinching occurs at a point A (a load Ta, a rotation speed Na) during the operation of the door D, the rotation speed of the door opening and closing motor M1 decreases. When the advance angle control on the door opening and closing motor M1 is being performed, the rotation speed decreases to Nb2 (the threshold speed) at the time when the load increases from Ta to Tb, and the pinching is detected (at a point B2). On the other hand, when the normal control is being performed, the rotation speed only decreases to Nb1 (Nb1<Nb2) at the time when the load increases from Ta to Tb, and thus the pinching is not detected (at a point B1). That is, when the normal control is being performed, the pinching is detected (at a point C) at the time when the load increases from Ta to Tc and the rotation speed decreases to Nb2.

The inclination detection unit 94 detects an inclination angle of the vehicle body B based on a detection signal of a G sensor 46 (an acceleration sensor), for example. In the vehicle V including an existing acceleration sensor, the existing acceleration sensor may also be used as the G sensor 46.

Figure 2:
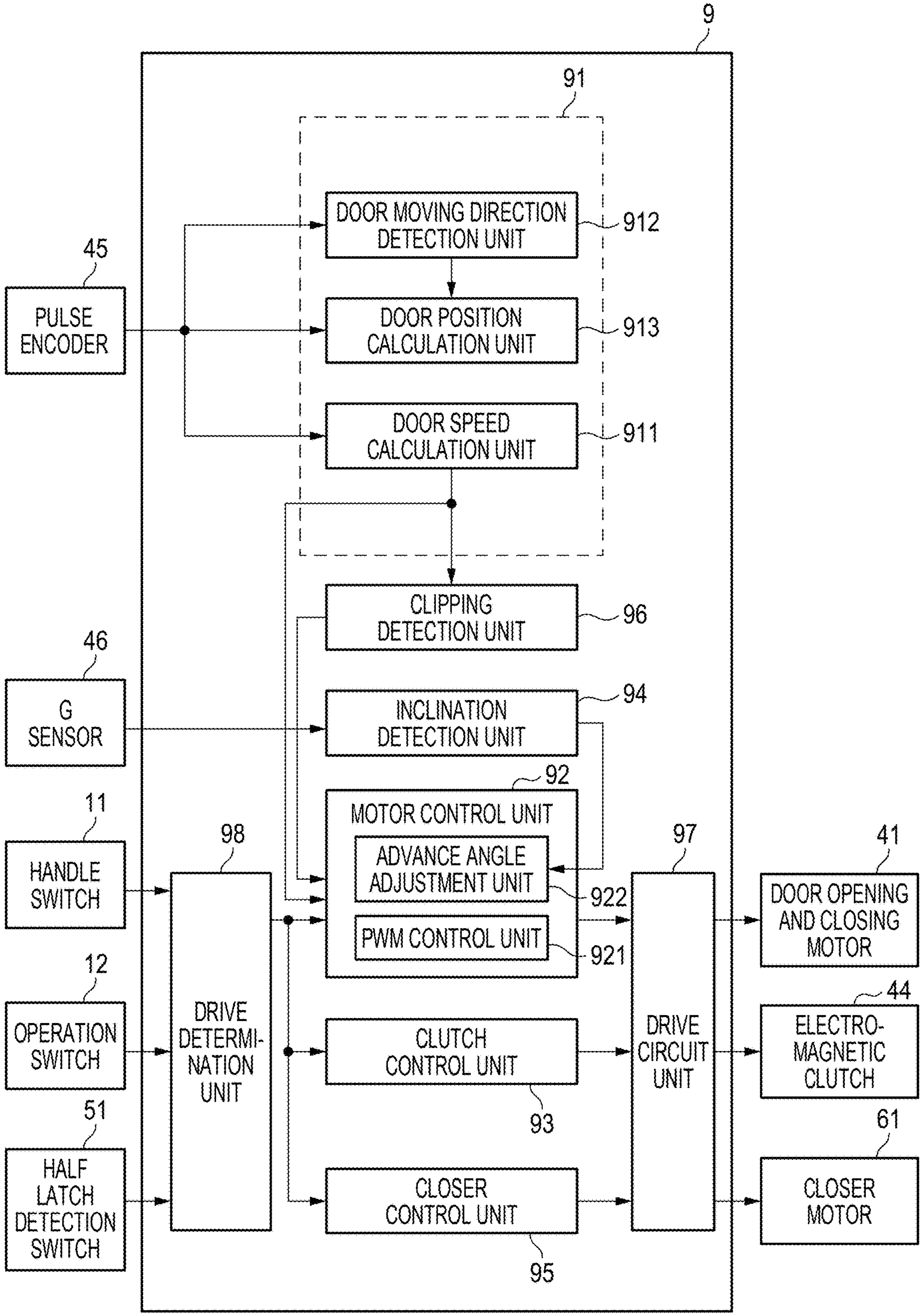
FIG. 2 is a block diagram illustrating a configuration of a control device 9.

As illustrated in FIG. 2, the inclination detection unit 94 sends the detected inclination angle of the vehicle body B to the advance angle adjustment unit 922 of the motor control unit 92. The advance angle adjustment unit 922 changes the advance angle of the door opening and closing motor M1 based on the inclination angle of the vehicle body B. That is, since the torque required for opening and closing the door D differs depending on the inclination angle of the vehicle body B, both the opening and closing operation and the pinching detection of the door D can be appropriately controlled by switching the motor characteristics of the door opening and closing motor M1 according to the required torque.

Specifically, the door D according to the present embodiment is a slide door of which opening and closing operation is performed in the front-rear direction, and when an operation direction of the door D is inclined upward, the required torque increases because the door D operates against its own weight, and when the operation direction of the door D is inclined downward, the required torque decreases because the door D operates due to its own weight. For example, when the vehicle body B is inclined forward and downward, as compared to a case in which a front-rear inclination angle is 0, the torque required for the opening operation of the door D increases, and the torque required for the closing operation of the door D decreases. Further, when the vehicle body B is inclined rearward and downward, as compared to the case in which the front-rear inclination angle is 0, the torque required for the opening operation of the door D decreases, and the torque required for the closing operation of the door D increases. Then, when the advance angle control is constantly performed in the opening and closing operation of the door D, a torque of the door opening and closing motor M1 is insufficient at the time of inclination of the vehicle body B in which the required torque increases, and there is a possibility that the opening and closing operation of the door D cannot be smoothly performed, and therefore, the advance angle adjustment unit 922 changes the advance angle of the door opening and closing motor M1 based on the inclination angle of the vehicle body B.

The above contents are the same for a back door, the case where the vehicle body B is inclined forward and downward refers to the case where the operation direction of the door D is inclined upward, and the case where the vehicle body B is inclined rearward and downward refers to the case where the operation direction of the door D is inclined downward. Further, regarding a side door, it is set that the case where the vehicle body B is inclined rearward and downward refers to the case where the operation direction of the door D is inclined upward, and the case where the vehicle body B is inclined forward and downward refers to the case where the operation direction of the door D is inclined downward, and thus the same consideration can be given.

In the following description, an inclination angle at which the operation direction of the door D is inclined upward, in other words, an inclination angle at which the required torque increases is defined as positive with reference to the case where the front-rear inclination angle is 0. That is, the case where the inclination angle is positive refers to a case where the vehicle body B is inclined forward and downward in the opening operation of the door D, and refers to a case where the vehicle body B is inclined rearward and downward in the closing operation of the door D.

For example, the advance angle adjustment unit 922 performs the advance angle control with setting the advance angle to a first value $\alpha°$ when the inclination angle of the vehicle body B is equal to or less than a first set value a (a>0), and performs the normal control with setting the advance angle to 0° when the inclination angle of the vehicle body B is larger than the first set value a. In this way, in a region where the inclination angle of the vehicle body B is small, an opening and closing torque of the door D is small, and thus the pinching load of the door D is reduced by performing the advance angle control, and in a region where the inclination angle of the vehicle body B is large, the opening and closing torque of the door D is large, and thus the opening and closing operation of the door D becomes smooth by performing the normal control.

The advance angle adjustment unit 922 may gradually reduce the advance angle as the inclination angle of the vehicle body B increases. For example, the advance angle adjustment unit 922 performs the advance angle control with setting the advance angle to the first value $\alpha°$ when the inclination angle of the vehicle body B is equal to or less than the first set value a (a>0), performs the advance angle control with setting the advance angle to a second value $\beta°$ ($\beta° < \alpha°$), which is smaller than the first value $\alpha°$, when the inclination angle of the vehicle body B is larger than the first set value a and is equal to or less than a second set value b, which is larger than the first set value a (b>a), and performs the normal control when the inclination angle of the vehicle body B is larger than the second set value b. In this way, a more appropriate advance angle can be applied based on the inclination angle of the vehicle body B. The required torque may be calculated based on the operation direction of the door D and the inclination angle of the vehicle body B, and the advance angle may be adjusted based on the required torque that is calculated.

The opening operation signals of the handle switch 11 and the operation switch 12, and a half latch signal of the half latch detection switch 51 are input to the drive determination unit 98 which is an input side of the control device 9.

The door opening and closing motor M1, the electromagnetic clutch 44, and the closer motor 61 are electrically connected to the drive circuit unit 97 which is an output side of the control device 9.

Next, opening and closing control performed by the control device 9 will be described based on the flowcharts illustrated in FIGS. 5 and 6.

Figure 5:
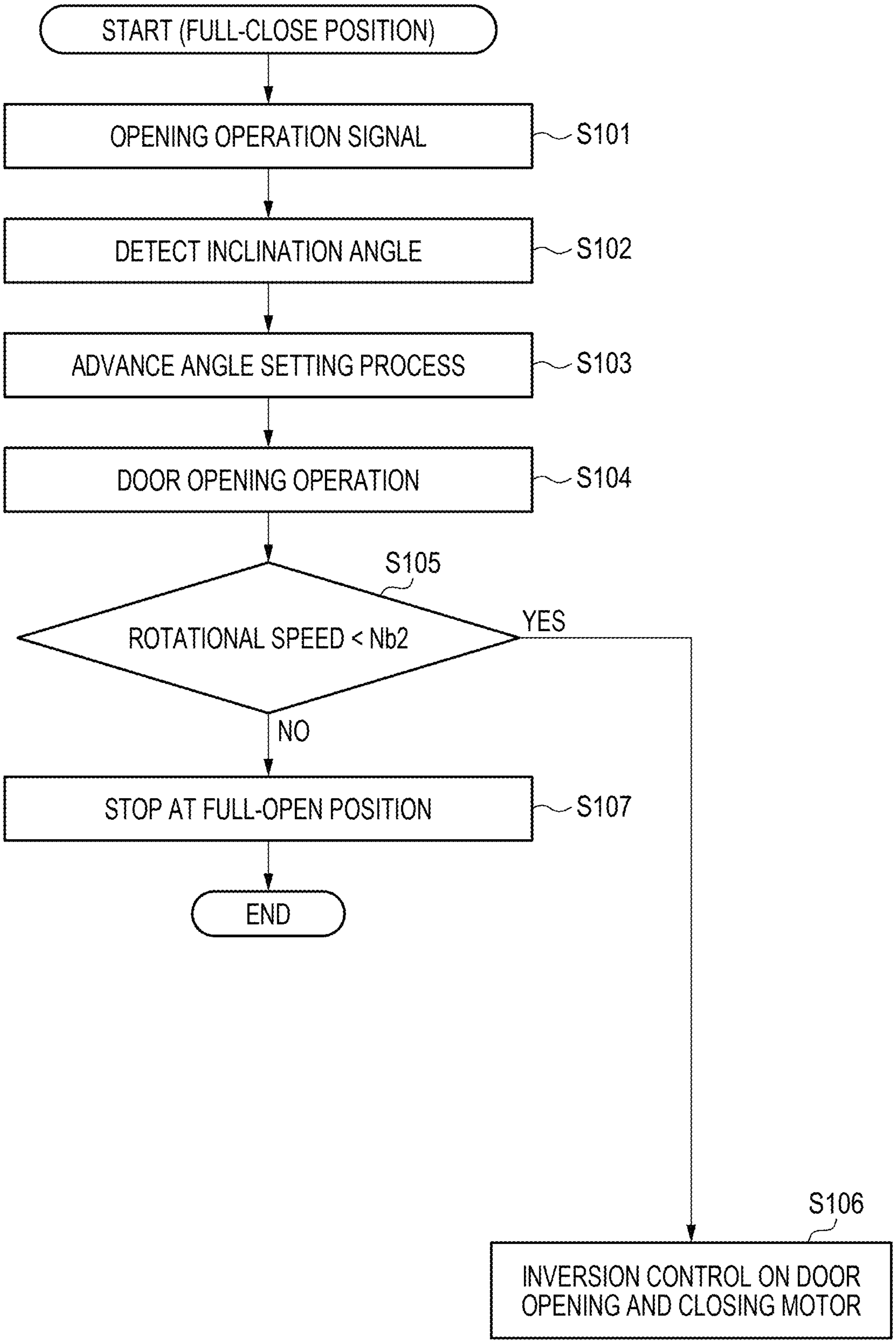
FIG. 5 is a flowchart illustrating a control procedure at the time of a door opening operation.

As illustrated in FIG. 5, when receiving the opening operation signal from the handle switch 11 or the operation switch 12 (S101), the control device 9 detects the inclination angle of the vehicle body B (S102), and executes an advance angle setting process (see FIGS. 7 to 10) to be described later based on the inclination angle (S103).

Next, the control device 9 starts the opening operation of the door D (S104), and determines whether the rotational speed of the door opening and closing motor M1 is smaller than the threshold value Nb2 during the opening operation of the door D (S105). When a determination result of step S105 is YES, the control device 9 determines that the pinching state of the door D occurs and performs the inversion control on the door opening and closing motor M1 (S106). Further, when the determination result of step S105 is NO, the control device 9 stops the opening operation of the door D in response to the door D reaching the full-open position (S107).

Figure 6:
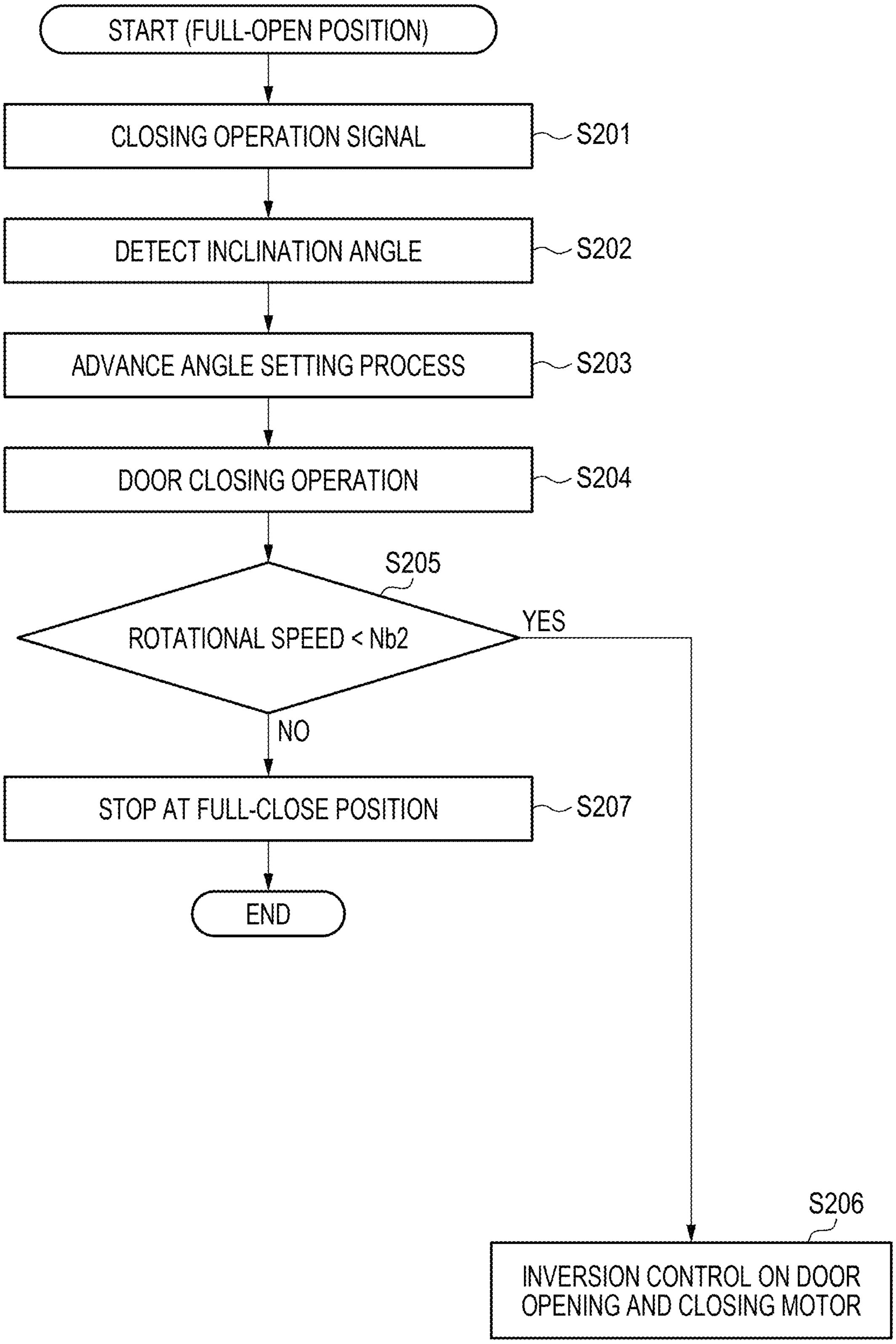
FIG. 6 is a flowchart illustrating a control procedure at the time of a door closing operation.

As illustrated in FIG. 6, when receiving a closing operation signal from the handle switch 11 or the operation switch 12 (S201), the control device 9 detects the inclination angle of the vehicle body B (S202), and executes the advance angle setting process (see FIGS. 7 to 10) to be described later based on the inclination angle (S203).

Next, the control device 9 starts the closing operation of the door D (S204), and determines whether the rotational speed of the door opening and closing motor M1 or the closer motor 61 is smaller than the threshold value Nb2 during the closing operation of the door D (S205). When a determination result of step S205 is YES, the control device 9 determines that the pinching state of the door D occurs and performs the inversion control on the door opening and closing motor M1 or the closer motor 61 (S206). Further, when the determination result of step S205 is NO, the control device 9 stops the closing operation of the door D in response to the door D reaching the full-close position (S207).

Next, four examples of the advance angle setting process performed by the control device 9 will be described based on the flowcharts illustrated in FIGS. 7 to 10.

Figure 7:
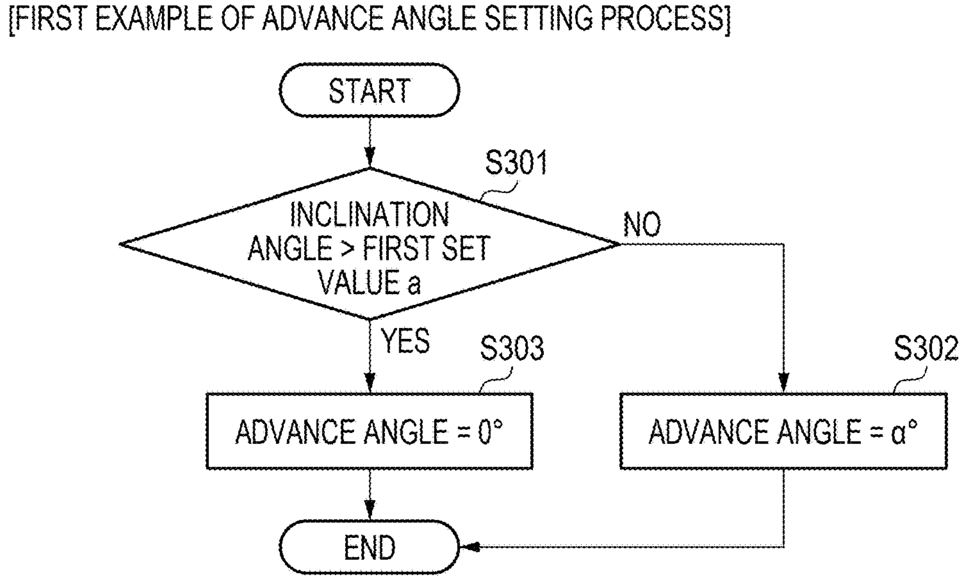
FIG. 7 is a flowchart illustrating a first example of an advance angle setting process.

In a first example of the advance angle setting process illustrated in FIG. 7, the control device 9 determines whether the inclination angle of the vehicle body B is larger than the first set value a (a>0) (S301). When a determination result of step S301 is NO, the control device 9 performs the advance angle control with setting the advance angle to $\alpha°$ (S302). When the determination result of step S301 is YES, the control device 9 performs the normal control with setting the advance angle to 0° (S303).

Figure 8:
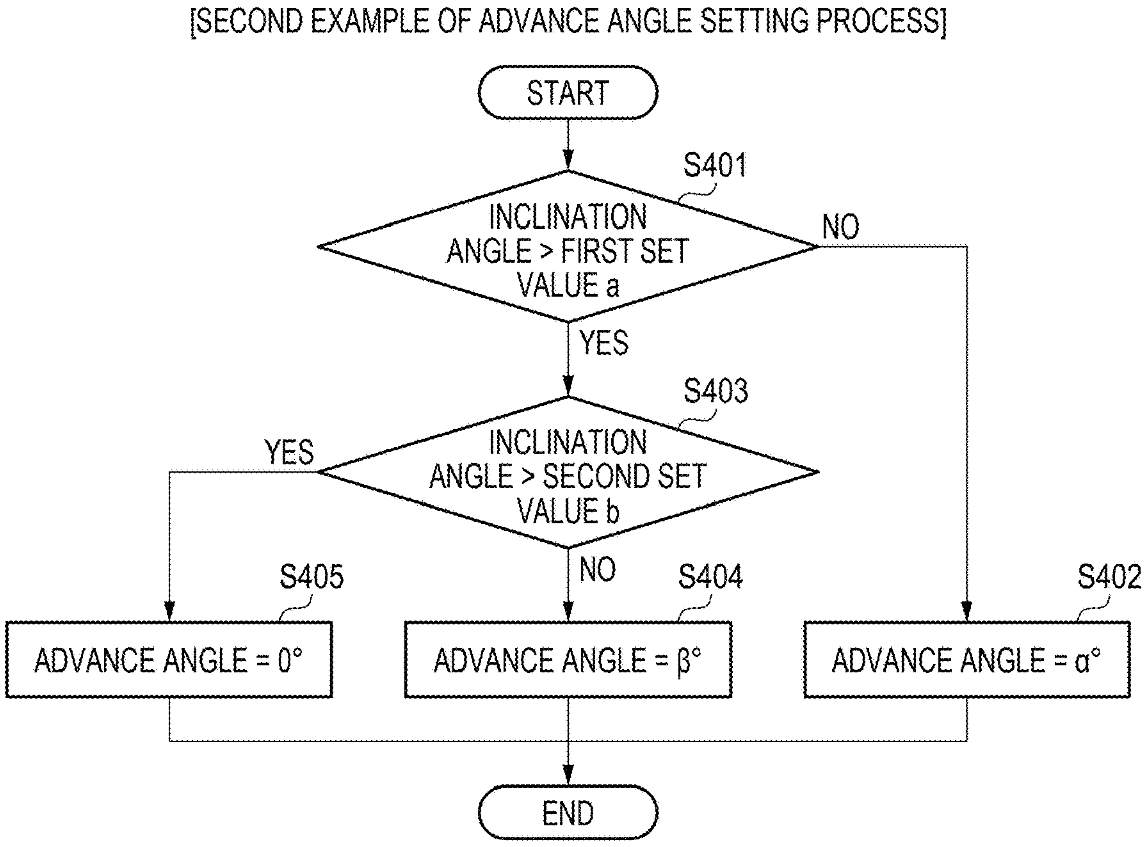
FIG. 8 is a flowchart illustrating a second example of the advance angle setting process.

In a second example of the advance angle setting process illustrated in FIG. 8, the control device 9 determines whether the inclination angle of the vehicle body B is larger than the first set value a (a>0) (S401). When a determination result of step S401 is NO, the control device 9 performs the advance angle control with setting the advance angle to $\alpha°$. When the determination result of step S401 is YES, the control device 9 determines whether the inclination angle of the vehicle body B is larger than the second set value b (b>a) (S403). When a determination result of step S403 is NO, the control device 9 performs the advance angle control with setting the advance angle to $\beta°$ ($\beta°<\alpha°$) (S404). When the determination result of step S403 is YES, the control device 9 performs the normal control with setting the advance angle to 0° (S405).

Figure 9:
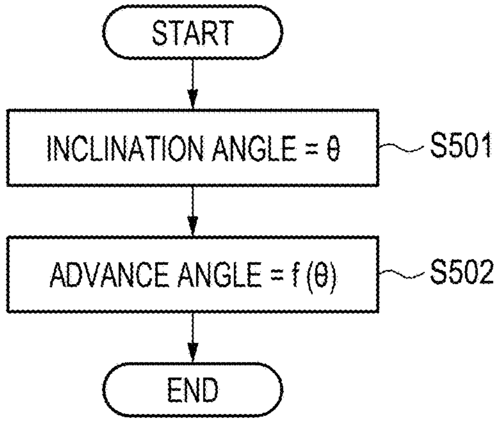
FIG. 9 is a flowchart illustrating a third example of the advance angle setting process.

In a third example of the advance angle setting process illustrated in FIG. 9, after detecting an inclination angle $\theta$ of the vehicle body B (S501), the control device 9 calculates the advance angle by using a function formula $f(\theta)$ having a predetermined coefficient k and the inclination angle $\theta$ as variables (S502), and performs the advance angle control or the normal control based on the calculated advance angle.

For example, the advance angle is calculated by using the following function formula $f(\theta)$.

$$f(\theta) = 30 - k \times \theta$$

Figure 10:
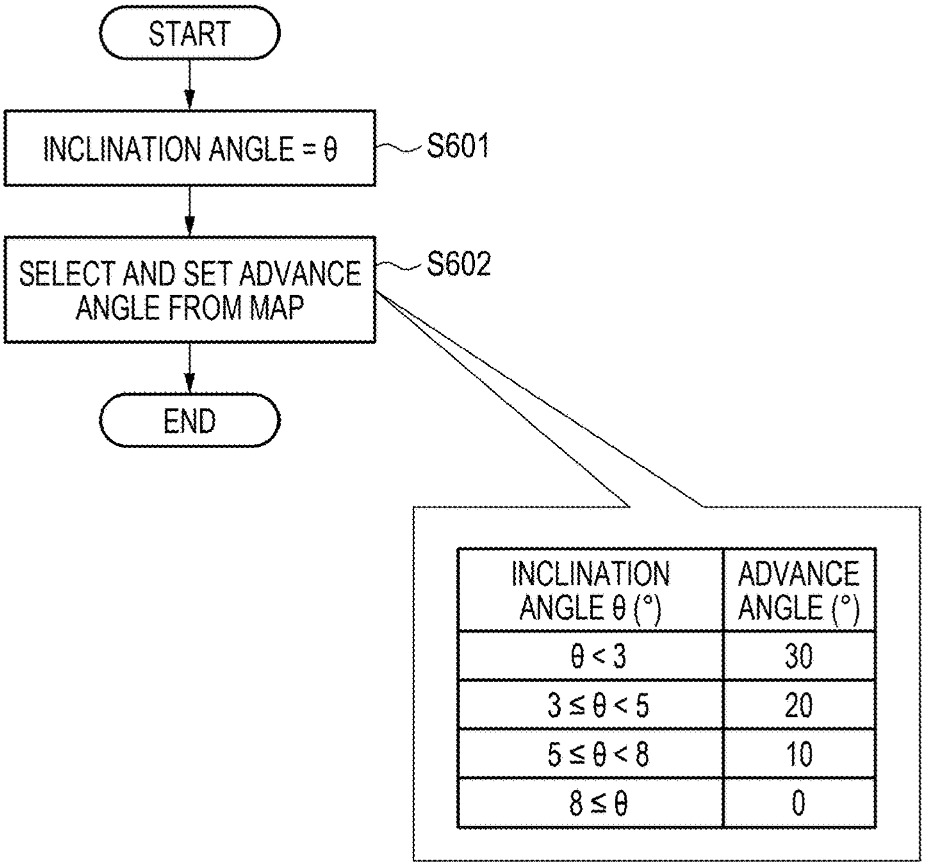
FIG. 10 is a flowchart illustrating a fourth example of the advance angle setting process.

Note that when $f(\theta) \leq \theta$, $f(\theta)=\theta$, and when $f(\theta) \geq 30$, $f(\theta)=30$ In a fourth example of the advance angle setting process illustrated in FIG. 10, after detecting the inclination angle $\theta$ of the vehicle body B (S601), the control device 9 selects the advance angle by referring to a preset map (S602), and performs the advance angle control or the normal control based on the selected advance angle.

(Modifications)

In a region where a load on the door D is prone to vary, the control device 9 can perform the advance angle control with reducing the advance angle or perform the normal control without performing the advance angle control, as compared with a region where the load on the door D is hard to vary. For example, when the door D is a slide door, the region where the load on the door D is prone to vary includes the full-close side region L1, which is the deceleration region before the door D reaches the half door position, and the full-open side region L3, which is a latch engaging region before the door D reaches the full-open position, and in these regions L1 and L3, erroneous detection of the pinching can be avoided by reducing the advance angle and performing the advance angle control, or by performing the normal control without performing the advance angle control.

Although various embodiments have been described above with reference to the drawings, it is needless to say that the present invention is not limited to such embodiments. It is apparent to a person skilled in the art that various modifications or corrections can be conceived within the scope described in the claims, and it is understood that the modifications or corrections naturally fall within the technical scope of the present invention. For example, the present invention may be applied to the back door, and may be applied to the side door. In addition, the constituent elements in the above embodiment may be freely combined without departing from the gist of the invention.

In this description, at least the following matters are described. The parentheses indicate the corresponding constituent elements and the like in the embodiment described above, but are not limited thereto.

(1) An opening and closing control device including:

a motor (door opening and closing motor M1) configured to drive, in an opening and closing direction, an opening and closing body (the door D) that is supported on a vehicle body (vehicle body B) and allowed to be opened and closed;

a controller (control device 9) configured to control the motor; and a pulse encoder (pulse encoder 45) that outputs a pulse signal, in which the controller includes:

a motor control unit (motor control unit 92) capable of adjusting an advance angle of the motor;

a pulse detection unit (pulse detection unit 91) capable of detecting a rotational speed of the motor or an opening and closing speed of the opening and closing body according to pulse detection based on the pulse signal output from the pulse encoder; and a pinching detection unit (pinching detection unit 96) that detects a pinching state of the opening and closing body, and the pinching detection unit detects the pinching state of the opening and closing body when the rotational speed of the motor or the opening and closing speed of the opening and closing body is equal to or less than a threshold value (threshold value Nb2) during advance angle control on the motor by the motor control unit.

According to (1), a torque change corresponding to the rotational speed change of the motor or an opening and closing speed change of the opening and closing body is reduced by performing the advance angle control on the motor. That is, the responsiveness of the rotational speed change of the motor or the opening and closing speed change of the opening and closing body at the time of occurrence of the pinching is improved. Accordingly, it is possible to accurately detect the pinching state without a current sensor. In addition, it is possible to reduce the pinching load at the time of the pinching detection.

(2) The opening and closing control device according to (1), in which the pinching detection unit detects the pinching state of the opening and closing body when the rotational speed of the motor or the opening and closing speed of the opening and closing body is equal to or less than the threshold value during normal control on the motor, in which the advance angle control is not performed, by the motor control unit.

According to (2), it is possible to avoid complication of the control by using the same threshold value during the normal control and the advance angle control on the motor. Further, it is possible to perform the appropriate pinching detection according to the cases by selectively using the normal control and the advance angle control.

(3) The opening and closing control device according to (1) or (2), further including:

an inclination detector (G sensor 46) configured to detect an inclination angle of the vehicle body, in which the motor control unit changes the advance angle based on the inclination angle.

According to (3), since the torque required for opening and closing the opening and closing body differs depending on the inclination angle, both the opening and closing operation and the pinching detection of the opening and closing body can be appropriately controlled by switching the control on the motor according to the required torque.

(4) The opening and closing control device according to (3), in which in a case where an operation direction is inclined upward in an opening and closing operation of the opening and closing body, the motor control unit performs the advance angle control when the inclination angle is equal to or less than a set value (the first set value a).

According to (4), in the region where the inclination angle is small, the opening and closing torque of the slide door is small, and thus the pinching load of the opening and closing body can be reduced by performing the advance angle control.

(5) The opening and closing control device according to (3), in which in a case where an operation direction is inclined upward in an opening and closing operation of the opening and closing body, the motor control unit reduces the advance angle as the inclination angle increases.

According to (5), in the region where the inclination angle is small, the opening and closing torque of the slide door is small, and thus the pinching load of the opening and closing body is reduced by performing the advance angle control, and in the region where the inclination angle is large, the opening and closing torque of the slide door is large, and thus the opening and closing operation of the opening and closing body becomes smooth by performing the normal control.

(6) The opening and closing control device according to (3), in which in a case where an operation direction is inclined upward in an opening and closing operation of the opening and closing body, the motor control unit performs the normal control on the motor in which the advance angle control is not performed when the inclination angle is larger than a set value (second set value b).

According to (6), in the region where the inclination angle is large, the opening and closing torque of the slide door is large, and thus the opening and closing operation of the opening and closing body becomes smooth by performing the normal control.

(7) The opening and closing control device according to (1) or (2), in which in an opening and closing operation region where a load on the opening and closing body is prone to vary, the motor control unit performs the advance angle control with reducing the advance angle or performs normal control on the motor in which the advance angle control is not performed, as compared with an opening and closing operation region where the load on the opening and closing body is hard to vary.

According to (7), it is possible to avoid the erroneous detection of the pinching state with reducing the advance angle and performing the advance angle control or by performing the normal control in the opening and closing operation region where the load on the opening and closing body is prone to vary.

(8) The opening and closing control device according to (7), in which the opening and closing body is a slide door, and the opening and closing operation region where the load on the opening and closing body is prone to vary includes a deceleration region before the opening and closing body reaches a half door position and a latch engaging region before the opening and closing body reaches a full-open position.

According to (8), the load on the opening and closing body is prone to vary in the deceleration region before the slide door reaches the half door position and in the latch engaging region before the slide door reaches the full-open position, and thus the erroneous detection of the pinching state can be avoided by performing the normal control.

What is claimed is:

1. An opening and closing control device, comprising:

a motor configured to drive, in an opening and closing direction, an opening and closing body that is supported on a vehicle body and allowed to be opened and closed;

a controller configured to control the motor;

a pulse encoder configured to output a pulse signal, and an inclination detector configured to detect an inclination angle of the vehicle body, wherein the controller is configured to:

adjust an advance angle of the motor;

change the advance angle based on the inclination angle;

detect a rotational speed of the motor or an opening and closing speed of the opening and closing body according to pulse detection based on the pulse signal output from the pulse encoder; and detect a pinching state of the opening and closing body when the rotational speed of the motor or the opening and closing speed of the opening and closing body is equal to or less than a threshold value during advance angle control on the motor.

2. The opening and closing control device according to claim 1, wherein the controller detects the pinching state of the opening and closing body when the rotational speed of the motor or the opening and closing speed of the opening and closing body is equal to or less than the threshold value before or after adjusting the advance angle of the motor.

3. The opening and closing control device according to claim 1, wherein in a case where an operation direction is inclined upward in an opening and closing operation of the opening and closing body, the controller performs the advance angle control when the inclination angle is equal to or less than a set value.

4. The opening and closing control device according to claim 1, wherein in a case where an operation direction is inclined upward in an opening and closing operation of the opening and closing body, the controller reduces the advance angle as the inclination angle increases.

5. The opening and closing control device according to claim 1, wherein in a case where an operation direction is inclined upward in an opening and closing operation of the opening and closing body, the controller performs the advance angle control when the inclination angle is smaller than a set value.

6. The opening and closing control device according to claim 1, wherein the opening and closing body is a slide door, an opening and closing operation region of the opening and closing body includes a first region where a first load having a first variability acts on the opening and closing body, and a second region where a second load having a second variability lower than the first variability acts on the opening and closing body, and the controller performs the advance angle control when the opening and closing body is positioned at the second region.

7. The opening and closing control device according to claim 6, wherein the first region includes a deceleration region before the opening and closing body reaches a half door position and a latch engaging region before the opening and closing body reaches a full-open position.

* * * * *